F. A. MILLER.
RUBBER PACKED PIPE COUPLING.
APPLICATION FILED AUG. 3, 1911.
1,032,761.
Patented July 16, 1912.
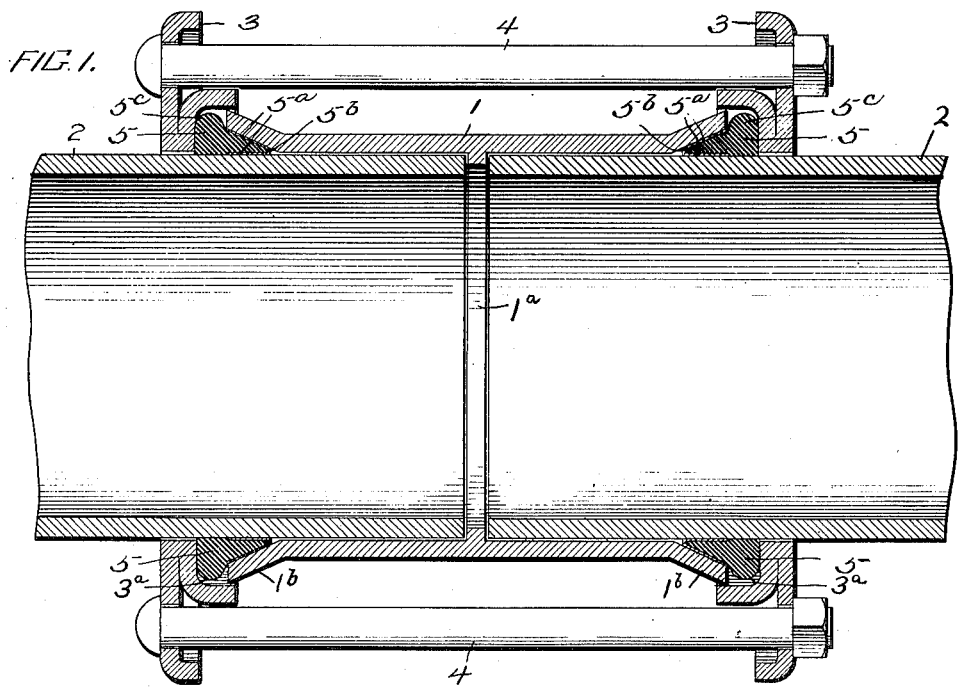
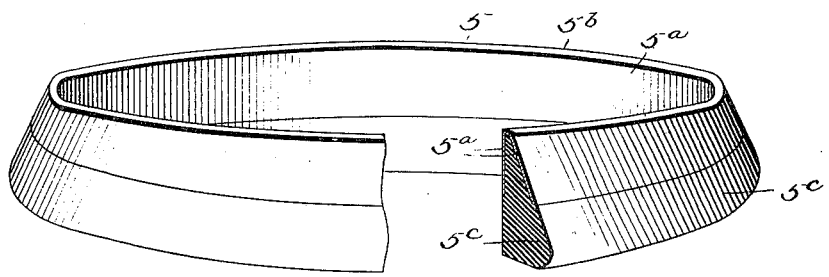
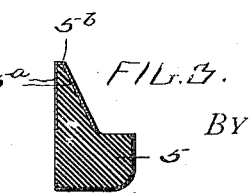
WITNESSES:
INVENTOR
Fred. A. Miller,
BY
Attorneys

UNITED STATES PATENT OFFICE.

FRED A. MILLER, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

RUBBER-PACKED PIPE-COUPLING.

1,032,761. Specification of Letters Patent. Patented July 16, 1912.

Application filed August 3, 1911. Serial No. 642,206.

*To all whom it may concern:*

Be it known that I, FRED A. MILLER, citizen of the United States, residing at Bradford, in the county of McKean and State of Pennsylvania, have invented certain new and useful Improvements in Rubber-Packed Pipe-Couplings; and I do hereby declare the following to be a full, clear, and exact description of the invention, such as will enable others skilled in the art to which it appertains to make and use the same.

My invention consists in the novel features hereinafter described, reference being had to the accompanying drawing in which I have shown an embodiment of the invention selected by me for the purpose of illustrating the invention and my said invention is fully disclosed in the following description and claims.

Referring to the said drawings, Figure 1 represents a sectional view of a rubber packed pipe coupling having my invention embodied therein. Fig. 2 is a perspective view of the packing ring partly cut away. Fig. 3 is a detail sectional view showing a slight modification of the packing ring.

My invention relates to packing rings for use with rubber packed pipe couplings. These packing rings are usually made in such shape as to provide a substantially wedge shaped portion which lies between the pipe section on the one side and a flared portion of the middle ring or coupling sleeve on the other side, the main body of the packing ring being also engaged by a recessed portion of a clamping ring by means of which the packing ring is forced under great pressure between the pipe section and the packing engaging portion of the middle ring. Under these circumstances it sometimes happens that on account of the friction between the rubber of which these packing rings are ordinarily made, and the engaged metal surfaces, the thin portion of the wedge shaped part of the ring may become distorted or crumpled so as not to pack satisfactorily, or it may even be cut or torn by contact with the metal parts. In some cases also the fluid passing through the pipe line may contain liquid matter, or deposit liquid matter which may find access to this wedge shaped portion of the packing rings and produce a deterioration of the rubber which in time may affect the tightness of the joint.

The object of my invention is to overcome these difficulties and to that end I provide the packing ring which is used with this type of pipe coupling and preferably the wedge shaped or entering portion only thereof, with a protecting armor of very thin, soft or inert metal such as lead, block tin or soft copper or other suitable metal which forms a stiffening and anti-friction covering for the entering portion of the ring, will perfectly protect the ring from contact with any liquids contained in the pipe line and will also facilitate the pressing of the ring into its seat by giving the wedge or entering portion of the ring a certain degree of stiffness and at the same time reducing the frictional engagement between the ring and the metal parts as the metal armor will slip more readily over the pipe and packing recess of the middle ring than the rubber will. This metal armor is at the same time sufficiently soft and yielding to adapt itself readily to the metal parts which it engages, especially under the back pressure of the elastic rubber, so as to make a perfectly tight joint. I prefer that this soft metal armor shall be applied only to the thinner portion of the wedge shaped part of the ring and that it shall be embedded in and vulcanized to the rubber ring, so that the exterior faces of the metal on both the inner and the outer peripheral portions of the ring, shall be flush with the contiguous surfaces of rubber.

In the accompanying drawing I have shown my invention applied to a rubber packed pipe coupling of the well known "Dresser" type which comprises the middle ring 1 which is placed over the meeting ends of the pipe sections 2, 2, said middle ring being provided with a centering rib or stop 1ª for centering the middle ring over the joint, and having its ends provided with flanges 1ᵇ, 1ᵇ forming packing recesses to receive the packing ring.

3, 3 represent the clamping rings each provided with a packing recess 3ª and 4, 4 represent the bolts for drawing the clamping rings together.

5, 5 represent my improved packing rings which are adapted to fit within the recesses 3ª of the clamping rings 3 and are provided with wedge shaped portions to extend into the spaces 1ᵇ between the flanges of the middle ring and the pipe sections 2, 2. Each of the packing rings 5, 5 is preferably composed of rubber and has the annular tip or entering wedge portion of the wedge shaped part provided with the soft metal armor indicated at 5ª. This armor is preferably composed of a single piece of metal having the exact form of the tip portion of the ring, or in other words being angular in cross section, the said armor being vulcanized to the rubber ring and embedded therein so that the outer faces of the metal are flush with the contiguous rubber faces of the ring. The lateral portions of the armor may extend more or less over the angularly disposed faces of the rubber packing ring, as may be found most desirable and they may inclose the angular faces of the rubber ring entirely if desired. I prefer, however, to form them in the manner shown. At the extreme tip portion of the ring, instead of having a knife edge or sharp edge formed by the angularly disposed faces of the armor, I prefer to have said angular portions of the metal connected by a short face 5ᵇ substantially perpendicular to the axis of the ring, thus making a blunt tip and enabling a larger body of rubber to be present at the extreme tip portion of the ring within the armor.

While the form of packing ring shown in Figs. 1 and 2 is my preferred form, I do not limit myself to the exact shape of the ring, as variations may be made in the same to adapt them to the construction of middle ring and clamping ring with which they are used. Thus in Fig. 3 I have shown a detail sectional view of a slightly different form of packing ring provided with the soft metal armor and embodying my invention and the form of the ring may be considerably varied without departing from my invention.

By having the armor extend only partially over the exterior and interior peripheral surfaces of the annular wedge shaped portion of the ring, the main body of the ring beyond the armor is given the most perfect freedom of expansion laterally without affecting the lateral expansion of the armored portion which, thus in no way confines the outermost portion of the ring body, as indicated at 5ᶜ, in Fig. 1, in which view the packing rings are shown under compression.

What I claim and desire to secure by Letters Patent is:—

1. A packing ring for pipe couplings formed of compressible material having its greatest thickness at one end and tapering to a thin entering edge at the other end, the portion adjacent to the entering edge having an inner substantially cylindrical face and an angularly disposed conical exterior face, and a stiffening and anti-friction covering of soft metal lying upon a portion of said cylindrical face, extending around the entering edge, and lying upon a portion of the conical face, to frictionally engage the metallic parts between which the ring is forced, to stiffen the thin portion adjacent to the entering edge, and protect it from distortion, and relieve its inner and outer faces from friction with said metallic parts.

2. A packing ring for pipe couplings formed of compressible material having its greatest thickness at one end and tapering to a thin entering edge at the other end, the portion adjacent to the entering edge having an inner cylindrical face and an outer conical face, a stiffening and anti-friction covering of soft metal, having a cylindrical portion engaging the inner face of the ring, a conical portion engaging the exterior conical face of the ring, and an annular face, disposed substantially perpendicularly to the axis of the ring engaging the extreme entering edge of the ring, thus providing a blunt tip and presenting a body of the compressible material within the extreme entering edge of said metallic covering whereby said covering will directly engage the metal parts between which the entering edge of the ring is forced, will stiffen the thin portion of the ring adjacent to the entering edge, and protect it from distortion, and relieve its outer and inner faces from friction with said metallic parts, said metallic covering extending only part way over the outer and inner faces of the ring toward the thick end of the ring leaving the exterior and interior faces of the compressible material at the thicker end of the ring to directly engage said metallic parts.

In testimony whereof I affix my signature, in the presence of witnesses.

FRED A. MILLER.

Witnesses:
JOHN P. MELVIN,
CHAS. J. GREGG,
C. C. COMFORT.